United States Patent
Mickelsen et al.

(10) Patent No.: US 11,994,897 B2
(45) Date of Patent: May 28, 2024

(54) SYSTEM AND METHOD FOR SYNCHRONIZING AND/OR DISCIPLINING CLOCKS

(71) Applicant: Universal Electronics Inc., Santa Ana, CA (US)

(72) Inventors: Jeremy Mickelsen, Santa Ana, CA (US); Michael Courtney, Santa Ana, CA (US); Khanh Nguyen, Santa Ana, CA (US); Haiming Huang, Santa Ana, CA (US); Jan Van Ee, Santa Ana, CA (US)

(73) Assignee: Universal Electronics Inc., Santa Ana, CA (US)

( * ) Notice: Subject to any disclaimer, the term of this patent is extended or adjusted under 35 U.S.C. 154(b) by 267 days.

(21) Appl. No.: 16/827,161

(22) Filed: Mar. 23, 2020

(65) Prior Publication Data

US 2021/0294377 A1    Sep. 23, 2021

(51) Int. Cl.
*G06F 1/12* (2006.01)
*G06F 1/06* (2006.01)
*G06F 1/14* (2006.01)

(52) U.S. Cl.
CPC .................. *G06F 1/12* (2013.01); *G06F 1/06* (2013.01); *G06F 1/14* (2013.01)

(58) Field of Classification Search
CPC ...................................... G06F 1/06; G06F 1/12
See application file for complete search history.

(56) References Cited

U.S. PATENT DOCUMENTS

| | | | |
|---|---|---|---|
| 6,061,450 A * | 5/2000 | Bauer .................. | H04M 7/006 379/207.15 |
| 6,185,692 B1 * | 2/2001 | Wolford .............. | G06F 13/4217 710/31 |
| 7,873,024 B1 | 1/2011 | Fenwick et al. | |
| 10,165,537 B1 | 12/2018 | Zarubica et al. | |
| 2012/0092184 A1 | 4/2012 | Carr | |
| 2014/0362872 A1 * | 12/2014 | Grenabo ............... | H04J 3/0667 370/507 |
| 2016/0188287 A1 * | 6/2016 | Sole ........................ | H04R 3/00 381/77 |
| 2016/0212194 A1 * | 7/2016 | Palin ..................... | G06F 3/0484 |

(Continued)

FOREIGN PATENT DOCUMENTS

WO    2019/170587 A1    9/2018
WO    2020046270 A1    3/2020

OTHER PUBLICATIONS

ISA/US, Int. Search Report and Written Opinion issued on PCT application No. PCT/US21/23220, dated Jul. 8, 2021, 13 pages.

(Continued)

*Primary Examiner* — Paul Yen
(74) *Attorney, Agent, or Firm* — Greenberg Traurig, LLP

(57) ABSTRACT

A method for synchronizing time within a local, networked system including a first device and a least one second device. The first device uses a short-wavelength, ultra-high frequency radio communications protocol to advertise a time that is being maintained by a first clock of the first device. The second device uses the received time to discipline a second clock of the second device such that the second clock of the second device is generally synchronized to the first clock of the first device.

9 Claims, 2 Drawing Sheets

(56) References Cited

U.S. PATENT DOCUMENTS

2017/0033942 A1\* 2/2017 Koeninger .......... H04L 12/2829
2017/0055236 A1    2/2017 Levesque et al.
2018/0063784 A1\* 3/2018 Abraham ........... A61N 1/37252
2018/0124731 A1    5/2018 Klotchkov et al.
2018/0210487 A1\* 7/2018 Ohara ...................... G04G 3/00
2019/0190635 A1\* 6/2019 Goel ................... H04W 56/001

OTHER PUBLICATIONS

Extended European Search Report from application No. 21776805.0, dated Jun. 29, 2023, 8 pp.

\* cited by examiner

SYSTEM AND METHOD FOR SYNCHRONIZING AND/OR DISCIPLINING CLOCKS

BACKGROUND

Many devices, such as microwaves, stoves, televisions, video recorders, clocks, etc., are programmable to use time as a trigger to cause a performance of one or more functions and/or to simply cause such time to be displayed to a user. However, such devices often do not coordinate their time with a nearby or a distant clock, the time maintained by such devices can drift over time, and/or the time maintained by a device may be different relative to other devices within an environment. Additionally, for regions that observe daylight saving time ("DST"), the clocks often do not automatically update when DST starts/ends.

In some instances, a device can be provided with an antenna and programming for use in receiving and processing time broadcast by the WWV/WWVH time services. However, it is seen that adapting a device to use such a service can be expensive (e.g., in terms of components costs and power usage) and may not be relevant to locations outside of the broadcast range of these services.

In further instances, a precision time protocol ("PTP") or a network time protocol ("NTP") can be used to synchronize clocks throughout a network. PTP is generally employed to synchronize financial transactions, mobile phone tower transmissions, sub-sea acoustic arrays, and other networks that require precise timing. Similarly, NTP is intended to synchronize all participating computers to within a few milliseconds of coordinated universal time ("UTC"). However, it is seen that adapting a device to use such a protocol can also be expensive and the level of accuracy provided via use of such protocols may not be relevant to most household applications.

Accordingly, the following describes a system and method for synchronizing and/or disciplining clocks that addresses these and additional drawbacks.

SUMMARY

The following generally describes a method for synchronizing time within a local, networked system including a first device and a least one second device. The first device uses a short-wavelength, ultra-high frequency radio communications protocol to advertise a time that is being maintained by a first clock of the first device. The second device uses the received time to discipline a second clock of the second device such that the second clock of the second device is generally synchronized to the first clock of the first device.

A better appreciation of the objects, advantages, features, properties, and relationships of the system and method for synchronizing and/or disciplining clocks will be obtained from the following detailed description and accompanying drawings which set forth illustrative embodiments which are indicative of the various ways in which the principles of the system and method may be employed.

BRIEF DESCRIPTION OF THE DRAWINGS

For use in better understanding the example system and method for synchronizing and/or disciplining clocks described hereinafter, reference may be had to the following drawings in which.

DESCRIPTION

The following describes a system and method for synchronizing and/or disciplining clocks.

Figure 1:
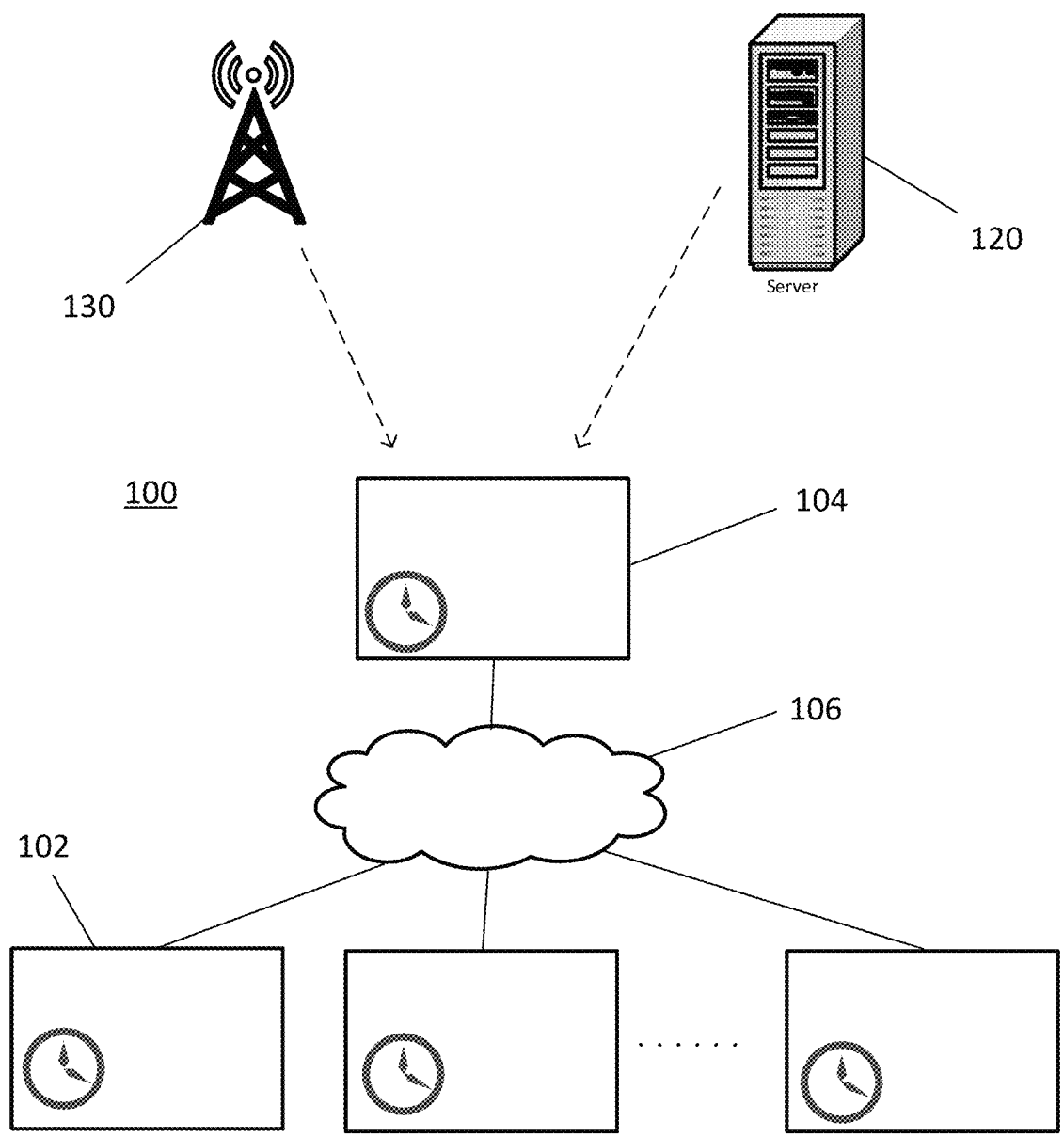
FIG. 1 illustrates an exemplary system in which the method for synchronizing and/or disciplining clocks may be performed.

By way of example only, FIG. 1 illustrates a system in which the hereinafter described method for synchronizing and/or disciplining clocks may be practiced. As illustrated, the system 100 includes a plurality of devices 102 that are communicatively coupled to at least a master device 104. The devices 102/104 may be any type of device, such as a microwave, a stove, a television, a video recorder, a clock, a thermostat, etc., that is at least programmable to use time as a trigger to cause a performance of one or more functions (which controllable functions may be local to the device itself and/or remotely located from the device) and/or that may simply cause such time to be displayed to a user. The master device 104 may also be a smart device having an appropriate app installed thereon.

As further illustrated in FIG. 1, the devices 102/104 (and other devices in the system 100) are communicatively coupled to each other via use of network 106. The network 106 may thus support wireless communications (for example, WiFi, Bluetooth, infrared, etc.) and/or wired communications between devices as desired and one or more devices may further support communications to and/or from device outside of the local environment in which the devices are located, for example, via use of the Internet or other wide-area network. In addition, the devices 102 that are at least programmable to use time as a trigger to cause a performance of one or more functions and/or that may simply cause such time to be displayed to a user will be adapted to at least receive communications from the master device 104 via use of Bluetooth Low Energy ("BLE") communications for reasons which will be discussed in greater detail hereinafter. As known to those of skill in the art, Bluetooth is a wireless technology standard used for exchanging data between fixed and mobile devices over short distances using short-wavelength UHF radio waves in the industrial, scientific and medical radio bands, from 2.400 to 2.485 GHz.

Figure 2:
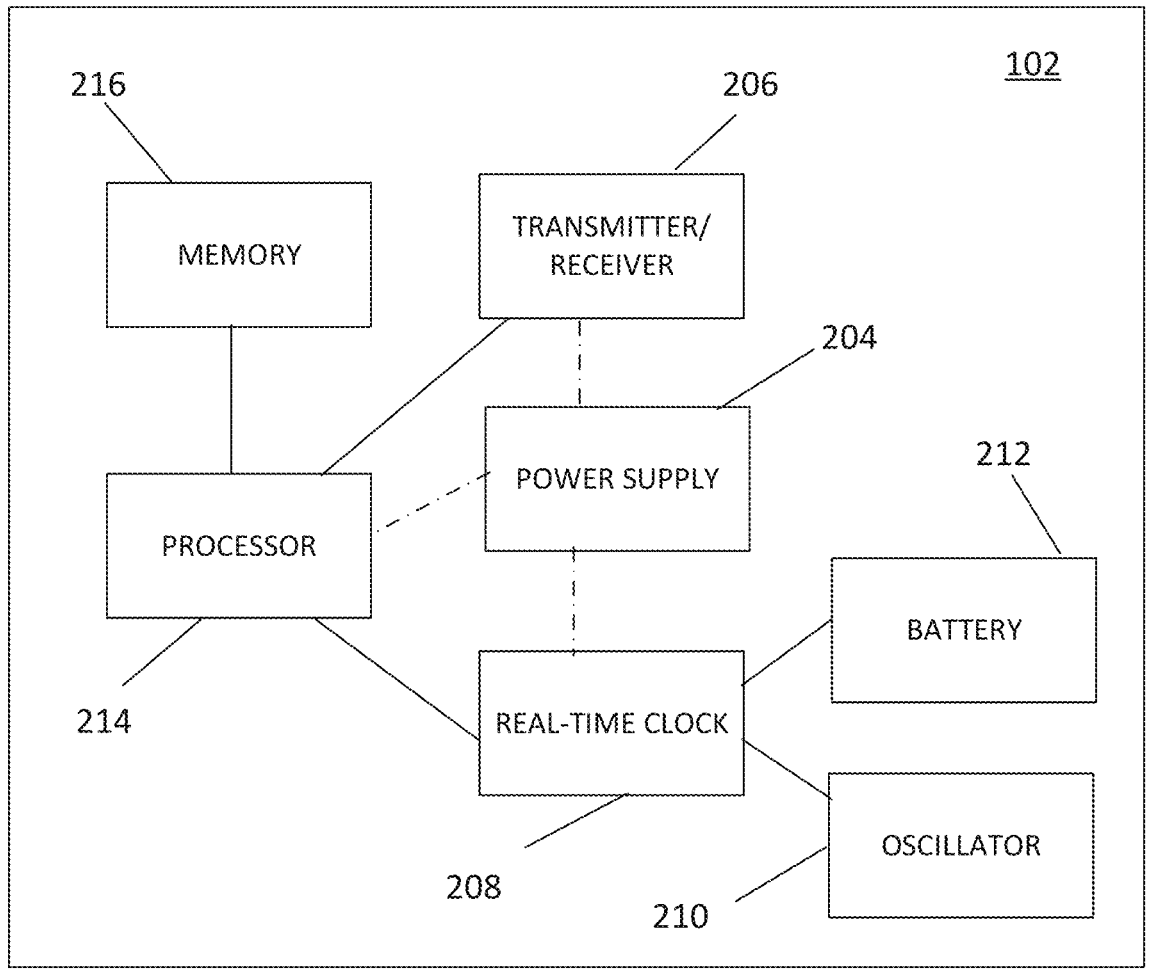
FIG. 2 illustrates exemplary components of a device within the system of FIG. 1.

To facilitate communications between at least the master device 104 and the device(s) 102 and to allow the device(s) 102 to keep track of time, the device 102 may include a power supply 204, a receiving (and, as needed, a transmission) module 206, a real-time clock 208, a crystal oscillator 210, a battery backup 212, an electronic processor 214, and a memory 216 storing instructions executable by the processor 214. The processor 214 executes software that will allow the device 102 to at least receive communications from the master device 104, to configure itself for operation, to perform or otherwise control functional operations (of itself or other devices for which device 102 acts as a remote control) in response to time based triggers, to receive input, to generate output, and the like. The components illustrated in FIG. 2, along with other various modules and components as need for any particular purpose, are coupled to each other by or through one or more control or data buses that enable communication therebetween. The use of control and data buses for the interconnection between and exchange of information among the various modules and components would be apparent to a person skilled in the art in view of the description provided herein.

The master device 104 will also include at least the above elements to thereby allow the master device 104 to communicate with devices 102, to configure itself for operation, to perform or otherwise control functional operations in response to real-time triggers, to receive input, to generate output, and the like, as well as any components as needed to communicate with/receive time information from external sources as needed. While not required, the master device 104 may have its real-time clock updated via use of a time transmission received from a source that is external to the environment, such as from the Internet 120, via RF broadcast 130, from a cable head-end service, etc., as further illustrated in FIG. 1.

Should the time maintained by a device 102 become inaccurate, e.g., because the time has drifted, the device 102 has not accounted for DST, etc., it will be appreciated that the functionality of the device 102 may be substantially degraded. For example, if the device 102 is configured to run a time-based schedule, e.g., to record a program, to turn on/off a HVAC system component, to lock/unlock a door, to start cooking, etc., the device 102 will not be able to run as desired. Accordingly, through a connection to a master device 104, it is intended that the device 102 can receive the current time locally. The device 102 can thus maintain its ability to run time-based schedules, even when other timing sources are unavailable.

More particularly, to prevent the time as maintained by a device 102 from becoming too inaccurate and/or to ensure that devices within a given system maintain a substantially common time (especially those devices that are intended to cooperate based, at least in part, on time), it is preferred that the master device 104 periodically transmit to one or more of the devices 102 a real-time of the day. The transmission may include data needed for adjustments for DST and local variations, may include an estimate of an accuracy of the time, etc. In some circumstances, the master device 104 can also transmit an upcoming time transmission schedule to thereby allow device(s) 102 to wake up, as needed, for the purpose of receiving a forthcoming. scheduled time transmission from the master device 104.

To provide the common time reference to the device(s) 102 within the system, it is particularly contemplated that the master device 104 will use the BLE protocol to advertise a the time of day and the time of day transmission schedule as needed. In this regard, it will be appreciated that the BLE protocol provides a mode by which a device can use a unidirectional communication to advertise data and/or events, thereby achieving a communication without requiring the device to be entered into a bonded, classic Bluetooth connection. Meanwhile, the devices 102 will be programmed to use a received time of day transmission to discipline their clocks as appropriate to minimize jitter. In this regard, it will be appreciated that, under ordinary conditions, a clock discipline routine gradually slews the clock to the correct time, so that the time is effectively continuous and never stepped forward or backward. By way of example and without limitation, an adaptive parameter, hybrid phase/frequency-lock feedback loop algorithm can be utilized for this purpose.

As noted previously, in some instances the device 102 can use its clock to trigger itself to wake-up for the purpose of receiving a time advertisement from the master device 104. In this manner, a battery powered device 102 can limit the amount of time that the device will need to actively listen for an advertisement broadcast from the master device 104. In addition, the device 102 can automatically (or be manually programmed to) adjust how often the device 102 may need to listen for a time advertisement. For example, if it is seen that the clock of a device is not experiencing more than a predetermined amount of drift upon receiving one or more time transmissions from the master device, the device 102 can be caused to listen for time advertisements less frequently. Similarly, if there is a lesser need for the device 102 to maintain "highly accurate" time, the device 102 can be caused to listen for time advertisements less frequently.

In some circumstances, the master device 104 can itself be programmed to automatically cause an adjustment to the time that is being maintained by devices 102. As noted, such an adjustment may be caused by the occurrence of a DST event. In addition, the master device 104 can be programmed to cause clocks within the system to be synchronized to a time that is x amount of time ahead of or behind the actual real time as desired. For example, it may be desired for all or some of the clocks within the system to run 5 minutes ahead of real-time during the work week while reverting to actual real-time on the weekends. As will be appreciated, such dynamic time adjustments can be performed via use of the subject system and method and these and any adjustments can be programmed into the system by, for example, using an appropriate user interface that is provided by an app installed on a smart device or the like.

In the case where there are multiple master devices 104 in a control network, one device 104 may be selected to become the overall master time server. By way of example, devices participating in the network as time servers may be given a priority value based on their device type and the priority value may determine the frequency at which time stamp messages are initiated by that particular type of device. The device with the highest priority will send time stamp messages most frequently and therefore will have the shortest time between time stamp message transmissions. Each master device 104 will send a time stamp message and will then wait for a predetermined time period (e.g., starts a timer), based on its priority value, before sending another time stamp message. Unless the master device 104 receives a time stamp message from another device 104 during the time period, it will send another time stamp message when the time period expires. When a device 104 does receive a time stamp message from another device 104, it will update its own time, and reset its priority timer. In this way, a control network with multiple time serving devices 104 will eventually have all but one of the master time devices 104 (that is, the server with the highest priority) stop sending messages. Furthermore, this method also ensures that, if a master time device 104 is removed from the network, another device can take over the role of master.

While specific embodiments have been described in detail, it will be appreciated by those skilled in the art that various modifications and alternatives to those details could be developed in light of the overall teachings of the disclosure. For example, one of ordinary skill in the art, and based on a reading of this detailed description, would recognize that the electronic based aspects of the invention may be implemented in hardware and/or in software (e.g., stored on non-transitory computer-readable medium) executable by one or more processors. As such, it should be noted that a plurality of hardware and software based devices, as well as a plurality of different structural components may be utilized to implement the invention hereinafter claimed. Furthermore, "processor" as described in the specification can include one or more processors, one or more memory modules including non-transitory computer-readable medium, one or more input/output interfaces, and various connections (e.g., a system bus) connecting the components. Accordingly, it will be understood that the particular arrangements and procedures disclosed are meant to be illustrative only and not limiting as to the scope of the invention which is to be given the full breadth of the appended claims and any equivalents thereof.

What is claimed is:

1. A method for synchronizing time within a local, networked system including a first device and a least one second device, comprising:

using by the first device a short-wavelength, ultra-high frequency radio communications protocol to advertise via a unidirectional, non-bonded communications link from the first device to the at least one second device within the local, networked system a real-time that is being maintained by a first clock of the first device;

using by a clock discipline routine of the second device the received real-time to discipline a second clock of the second device such that the second clock of the second device is generally synchronized to the first clock of the first device;

wherein the clock discipline routine comprises an adaptive parameter, hybrid phase/frequency-lock feedback loop algorithm that functions to gradually slew the second clock of the second device to the real-time that is being maintained by the first clock of the first device.

2. The method as recited in claim 1, further comprising using a communication received from a third device external to the local, networked system to update the real-time that is being maintained by the first clock of the first device.

3. The method as recited in claim 2, wherein the third device communicates with the first device via use of a radio frequency broadcast message.

4. The method as recited in claim 2, wherein the third device comprises an Internet server.

5. The method as recited in claim 2, wherein the third device comprises a cable system head-end device.

6. The method as recited in claim 1, wherein the first device periodically advertises the real-time that is being maintained by the first clock of the first device according to a first schedule and wherein the first device also uses the short-wavelength, ultra-high frequency radio communications protocol to advertise the first schedule.

7. The method as recited in claim 6, wherein the second device uses the received first schedule to create a second schedule for use by the second device to ensure that the second device is readied to receive the real-time that is being maintained by the first clock of the first device when advertised by the first device according to the first schedule.

8. The method as recited in claim 7, wherein the second device uses the received real-time that is being maintained by the first clock of the first device when advertised by the first device according to the first schedule to automatically adjust the second schedule.

9. The method as recited in claim 1, wherein an app installed on a smart device is used to program the real-time that is being maintained by the first clock of the first device.

* * * * *